US006208467B1

(12) United States Patent
Naka et al.

(10) Patent No.: US 6,208,467 B1
(45) Date of Patent: Mar. 27, 2001

(54) DISPLAY APPARATUS FOR DISPLAYING AN IMAGE HAVING GRADATION

(75) Inventors: Kazutaka Naka, Yokohama; Michitaka Ohsawa, Fujisawa; Akihiko Kougami; Hiroshi Ohtaka, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/476,373

(22) Filed: Jan. 3, 2000

Related U.S. Application Data

(63) Continuation of application No. 09/127,602, filed on Jul. 31, 1998, now Pat. No. 6,014,258.

(30) Foreign Application Priority Data

Aug. 7, 1997 (JP) .................................................. 9-225727

(51) Int. Cl.[7] .................................................. G02B 27/10

(52) U.S. Cl. .......................... 359/618; 345/112; 345/204; 358/501; 358/507

(58) Field of Search ............................ 359/618; 345/204, 345/59, 60, 112; 358/501, 507, 527; 386/30, 42

(56) References Cited

U.S. PATENT DOCUMENTS

| | | | | |
|---|---|---|---|---|
| 5,612,711 | | 3/1997 | Rose | 345/59 |
| 5,724,053 | * | 3/1998 | Nagakubo | 345/60 |
| 5,818,419 | | 10/1998 | Tajima et al. . | |
| 5,854,540 | * | 12/1998 | Matsumoto et al. | 345/204 |
| 5,929,835 | | 7/1999 | Sakamoto | 345/112 |
| 6,040,819 | * | 3/2000 | Someya | 345/147 |
| 6,091,396 | * | 7/2000 | Minami et al. | 345/147 |

FOREIGN PATENT DOCUMENTS

| | | | |
|---|---|---|---|
| 0 621 624 A1 | | 10/1994 | (EP) . |
| 4-48535 | | 2/1992 | (JP) . |
| 4-211294 | | 8/1992 | (JP) . |
| 7-271325 | * | 10/1995 | (JP) . |
| 8-54852 | * | 2/1996 | (JP) . |
| 9-97035 | | 4/1997 | (JP) . |
| 9-127910 | | 5/1997 | (JP) . |
| 10-97218 | | 4/1998 | (JP) . |

OTHER PUBLICATIONS

"Fluorescent Material for Plasma Display Panel", by N. Iwase, Journal of Electronics, Mount Technology, (vol. 13, No. 7), published by Technology Party (Meet) Co., Jun. 20, 1997 Transaction.*

* cited by examiner

*Primary Examiner*—Loha Ben
(74) *Attorney, Agent, or Firm*—Antonelli, Terry, Stout & Kraus, LLP

(57) ABSTRACT

A display apparatus for displaying an image having gradation represented by subfields. The display apparatus includes a display panel, a circuit for outputting information in which a plurality of subfields in one field period is arranged so as to have first plural array portions where allotted light emitting weights increase gradually and second plural array portions where allotted light emitting weights decrease gradually, and a driver for forming a drive signal based on the information and for outputting the drive signal to the display panel.

29 Claims, 11 Drawing Sheets

FIG. 3
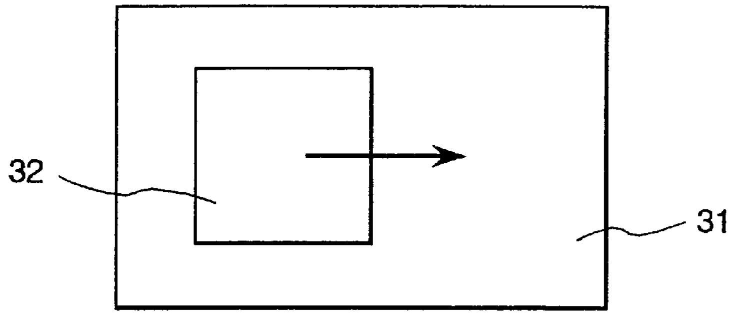
FIG. 4A
FIG. 4B
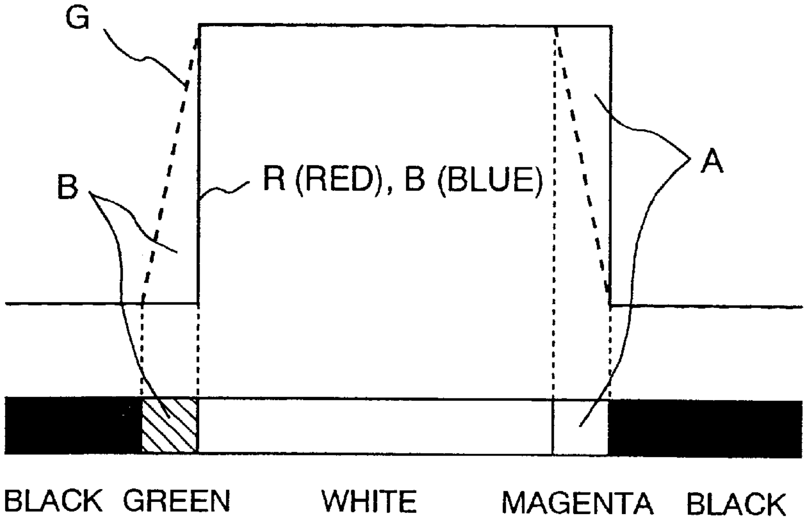

FIG. 5
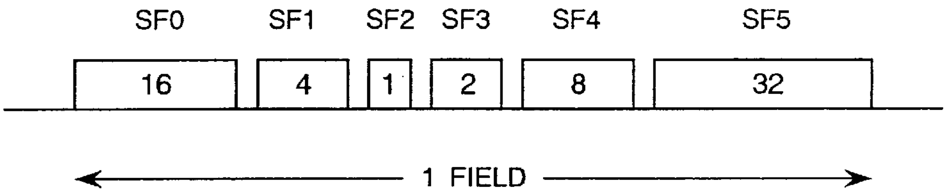
FIG. 6A
FIG. 6B
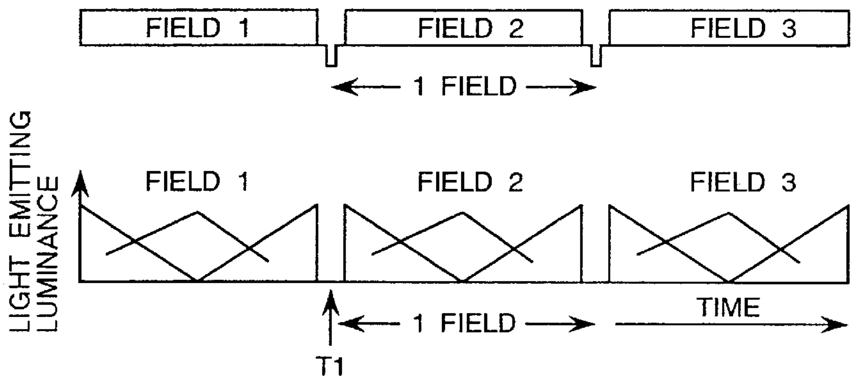

FIG. 9A
FIG. 9B
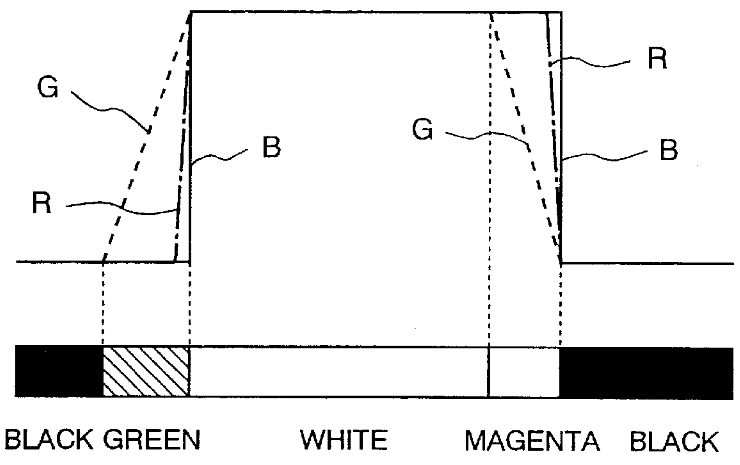
FIG. 10
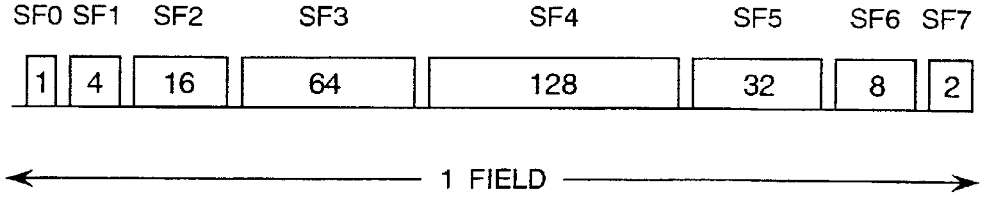

FIG. 16

| GRAY SCALE \ LIGHT EMITTING WEIGHT | SF0 | SF1 | SF7 | SF2 | SF6 | SF3 | SF5 | SF4 |
|---|---|---|---|---|---|---|---|---|
| | 1 | 2 | 2 | 6 | 6 | 12 | 12 | 18 |
| 0 | | | | | | | | |
| 1 | ○ | | | | | | | |
| 2 | | ○ | | | | | | |
| 3 | ○ | ○ | | | | | | |
| 4 | | ○ | ○ | | | | | |
| 5 | ○ | ○ | ○ | | | | | |
| 6 | | | | ○ | | | | |
| | | | | | | | | |
| 12 | | | | ○ | ○ | | | |
| | | | | | | | | |
| 18 | | | | | ○ | ○ | | |
| | | | | | | | | |
| 24 | | | | | | ○ | ○ | |
| | | | | | | | | |
| 30 | | | | | | | ○ | ○ |
| | | | | | | | | |
| 36 | | | | ○ | | | ○ | ○ |
| | | | | | | | | |
| 42 | | | | ○ | ○ | | ○ | ○ |
| | | | | | | | | |
| 48 | | | | | ○ | ○ | ○ | ○ |
| | | | | | | | | |
| 59 | ○ | ○ | ○ | ○ | ○ | ○ | ○ | ○ |

FIG. 17

| GRAY SCALE \ LIGHT EMITTING WEIGHT | SF0 | SF1 | SF7 | SF2 | SF6 | SF3 | SF5 | SF4 |
|---|---|---|---|---|---|---|---|---|
| | 1 | 2 | 2 | 6 | 6 | 12 | 12 | 18 |
| 0 | | | | | | | | |
| 1 | ○ | | | | | | | |
| 2 | | | ○ | | | | | |
| 3 | ○ | | ○ | | | | | |
| 4 | | ○ | ○ | | | | | |
| 5 | ○ | ○ | ○ | | | | | |
| 6 | | | | | ○ | | | |
| | | | | | | | | |
| 12 | | | | ○ | ○ | | | |
| | | | | | | | | |
| 18 | | | | ○ | | | ○ | |
| | | | | | | | | |
| 24 | | | | | | ○ | ○ | |
| | | | | | | | | |
| 30 | | | | | | ○ | | ○ |
| | | | | | | | | |
| 36 | | | | | ○ | ○ | | ○ |
| | | | | | | | | |
| 42 | | | | ○ | ○ | ○ | | ○ |
| | | | | | | | | |
| 48 | | | | ○ | | ○ | ○ | ○ |
| | | | | | | | | |
| 59 | ○ | ○ | ○ | ○ | ○ | ○ | ○ | ○ |

FIG. 18A
FIG. 18B
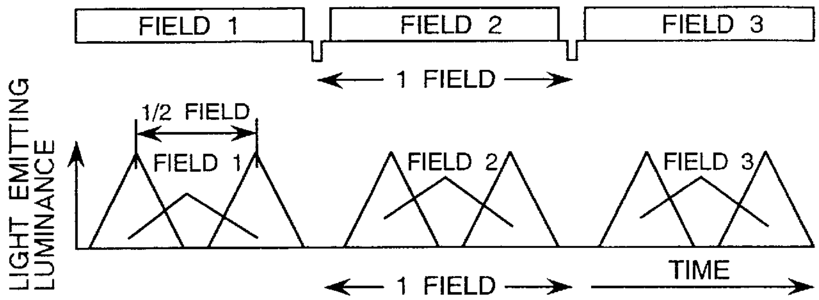
FIG. 19
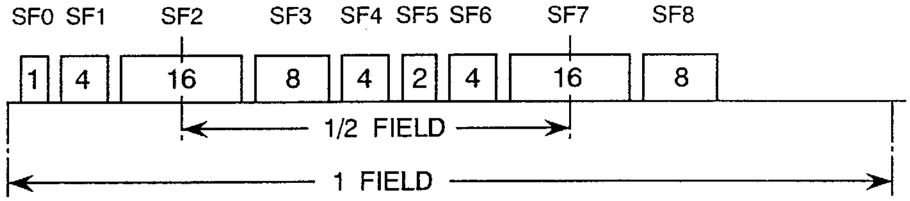
FIG. 20
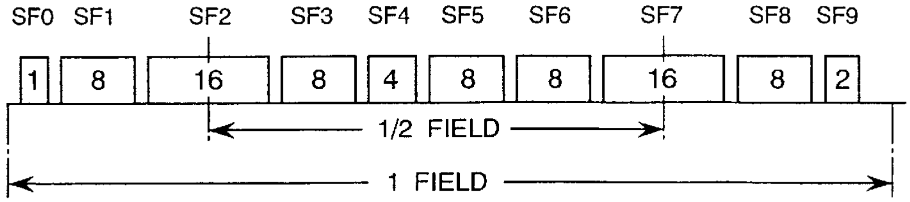

DISPLAY APPARATUS FOR DISPLAYING AN IMAGE HAVING GRADATION

CROSS REFERENCE TO RELATED APPLICATION

This is a continuation of U.S. application Ser. No. 09/127,602, filed Jul. 31, 1998, now U.S. Pat. No. 6,014,258, the subject matter of which is incorporated by reference herein.

BACKGROUND OF THE INVENTION

1. Field of the Invention

The present invention relates to a color image display apparatus which displays a color video image by controlling light emission of red (R), green (G) and blue (B) primary colors, and more particularly, to a color image display apparatus with an excellent dynamic resolution characteristic, which displays a high-quality moving image where color fringes at moving image edges are inconspicuous.

2. Description of the Prior Art

In recent years, in place of conventional Braun tube (CRT) display devices, flat-panel type display devices are becoming popular. These thin and light display panel devices, having a display panel where liquid crystal or plasma is sealed, display images with reduced image distortion, and receives reduced influence of earth magnetism. Among the flat-panel display devices, a plasma display device particularly draws public attention as a next-generation color image display device. The plasma display device is spontaneous light emitting device, and therefore it has a wide view angle. Further a large panel can be relatively easily constructed for this device. In this flat-panel display device, one pixel consists of red (R), green (G) and blue (B) light emitting cells. Color image display is realized by controlling the light emitting luminance levels of the respective light emitting cells.

Further, the plasma display device or the like having difficulty in displaying gray scale representation between "light emission (turned on)" and "non light emission (turned off)", employs a so-called subfield method for displaying the gray scale representation by controlling the light emitting luminance levels of the respective R, G and B light emitting cells. In the subfield method, one field is divided into a plurality of subfields on a time base, then light emitting weights are uniquely allotted to the respective subfields, and light emission in the respective subfields are on/off controlled. This attains luminance gradation (or tonality) representation.

For example, in a case where one field is divided into six subfields SF0 to SF5 and light emitting weights in the ratios 1:2:4:8:16:32 are respectively allotted to the subfields, 64 level gradation can be represented. At level "0", light emission is not performed in any of the subfields SF0 to SF5. At level "63" (=1+2+4+8+16+32), light emission is performed in all the six subfields.

In this manner, in the color image display device which controls the light emitting luminance levels of respective R, G and B light emitting cells by the subfield method, the image quality of a displayed moving image is greatly influenced by time response characteristics related to light emission by the R, G and B cells (hereinafter may be simply referred to "light emitting response characteristics") and the array of light emitting weights allotted to the respective subfields in each field.

The light emitting response characteristics of the R, G and B cells respectively indicate a light-emitting rise time characteristic from a point where a controller has instructed to start light emission to a point where light emitting luminance at the cell actually reaches a desired level, and a persistence time characteristic after the light emission instruction. Generally, if the persistence time is long, the light-emitting rise time is long. Accordingly, the persistence time is used as a representative characteristic of light emitting response characteristic. In the following description, the light emitting response characteristic is represented by the "persistence time" (a period from a point where the light emission is at the peak to a point where the light emission is at a level 1/10 of the peak). The "persistence time" includes the "light-emitting rise time characteristic".

The operation of this color image display device can be ideal operation as the light emitting response characteristics are short, however, the light emitting response characteristics cannot be reduced to zero. Further, as the light emitting response characteristics greatly depend on physical characteristics such as fluorescent materials used as the light emitting cells, it is very difficult to obtain uniform response characteristics in the R, G and B cells having different luminous wavelengths. For these reasons, when a moving image is displayed, the differences in time responses of the respective light emitting cells cause time lags in R, G and B light emission which overlap with each other, resulting in color shift (color fringing). The color shift appears at an edge portion where luminance greatly changes, e.g., from black to white or vice versa, as a phenomenon that a color different from the original image color is perceived. This seriously degrades image quality in moving image display.

Hereinbelow, the process of occurrence of color fringing interference at edge portions will be described with reference to FIG. 3 and FIGS. 4A and 4B. As shown in FIG. 3, a white rectangular pattern 32 on black background 31 is displayed on a display screen of a display device, and the white rectangular pattern 32 is moved rightward in FIG. 3. FIGS. 4A and 4B show color fringes occurred on the boundaries between white and black colors.

FIG. 4A shows the intensities (amplitudes) in the respective light emitting cells. FIG. 4B shows colors displayed on the display screen. As shown in FIG. 4A, as the G light emitting response is slower than the R and B light emitting responses, the G light emitting response represented with the broken line is delayed from the R and B light emitting responses represented with the solid lines. Thus, color fringing occurs in edge areas A and B. As shown in FIG. 4B, in the edge area A, a color of magenta (R+B) is perceived due to shortage of the amplitude of G with respect to R and B. In the edge area B, a color of green (G) is perceived due to excess amplitude of G. The edge area where color fringing occurs becomes wider as the speed of moving image increases.

In this manner, in the white and black video signal, colors not included in the original image (magenta and green) are perceived depending on the motion of the image. This seriously degrades the image quality. Especially, in the plasma display device and the like, material having persistence time of 12 ms or longer is often used as a G light emitting cell. As the response of the G cell using this material is slower than the responses of R and B cells, the consequent color fringing in edge areas is a main factor of degradation of image quality.

On the other hand, in the display devices which displays gray scale representation by the subfield method, the dynamic resolution is greatly influenced by the array of light emitting weights for the respective subfields in each field. To prevent degradation of dynamic resolution, it is preferable to perform light emission, based on a video signal that arrives for one field, as impulses for a very short period within each field period. In the CRT display devices, one field period is required for horizontal and vertical scan processing, however, impulse-like light emission is made for one pixel at a particular display screen position, in each field.

However, in the gradation representation by the subfield method, as the video signal that arrives for one field is divided into a plurality of subfields within the field for light emission and display, impulse light emission cannot be made for a short period. For this reason, it is difficult to realize a dynamic resolution characteristic equivalent to that of the CRT device.

Hereinbelow, the phenomenon where the dynamic resolution is degraded in correspondence with the array of light emitting weights for subfields will be described with reference to FIG. 5, FIGS. 6A and 6B and FIGS. 7A and 7B. In this case, the white rectangular pattern 32 shown in FIG. 3 is displayed by a display device having a subfield arrangement for 64 (level “0” to level “63”) level representation with six subfields in FIG. 5. In a white (level “63”) pixel, light emission is performed in all the subfields SF0 to SF5 in one field, and the ratios of light emission intensities are 16:4:1:2:8:32. This means the array of light emitting weights is made such that energy concentrates at the head and the end of the field.

FIG. 6 shows a v-shaped angular light-emitting luminance distribution in a case where light emitting weights for the subfields are arranged such that the light emitting weight gradually decreases and then gradually increases in each of field 1, field 2, . . . of sequentially inputted video signals. In this v-shaped light emission type subfield arrangement, light emission most highly concentrates around a boundary T1 between fields, and intense light emission occurs at field periods. In the boundary T1, light emission in the first field and that in the second field mix with each other. When the moving rectangular pattern is displayed, two images overlap with each other with a time lag therebetween as represented with the solid line in FIG. 7A. Thus, an image with seriously degraded resolution is perceived.

For example, if light emitting response time of the G-cell is slow, a pattern represented with the broken line in FIG. 7A is detected. Similar to FIGS. 4A and 4B, in edge areas A1 and A2, a color of magenta is perceived due to shortage of amplitude of G light emission, and in edge areas B1 and B2, a color of green is perceived due to excess amplitude of G light emission.

In this case, as the two images overlap with each other with a time lag therebetween, the resolution is degraded, and the luminance does not change abruptly. Accordingly, in comparison with the color fringing in FIGS. 4A and 4B, the range of interference is wider, while the density of false colors (magenta and green) is lower. In this manner, the arrangement of light emitting weights for the subfields and the response characteristics of the R, G and B cells are closely related with each other. As the arrangement of light emitting weights for the subfields reduces color fringing interference at edge portions due to the differences in light emitting response characteristics of the R, G and B cells, both characteristics must be optimized so as to realize high-quality moving image reproduction.

Note that the gradation representation by using the subfield method is disclosed in Japanese Examined Patent Publication No. 51-32051, for example, and a method to reduce false contour noise characteristic of the subfield method is disclosed in Japanese Examined Patent Publication No. 4-211294, for example.

In the above-described conventional color image display devices, regarding the light emitting response characteristics of R, G and B cells, the image quality of a still image is treated as first priority. In those devices, fluorescent materials are selected in consideration of chromaticity coordinates, white balance conditions and luminous efficiency and the like, however, light emitting response characteristics based on the image quality of a moving image have not been considered, otherwise, even if considered, the light emitting response characteristics of the respective cells are shortened as much as possible only to reduce persistence.

Further, in the subfield method, the array of light emitting weights for subfields is determined only to reduce flicker or false contour interference, characteristic of this method, however, the degradation of dynamic resolution characteristic has not been considered.

Further, in the conventional color image display devices, the interaction between the light emitting response characteristics of R, G and B cells and the array of light emitting weights for subfields has not been considered.

Accordingly, in the above-described conventional color image display devices, when a moving image is displayed, R, G and B light emission timings shift from each other due to the differences in light emitting response characteristics of R, G and B cells. Therefore, a color not included in the original image is perceived at an edge portion, and the image quality is seriously degraded.

Further, even in a case where the light emitting response characteristics of R, G and B cells are increased, if the arrangement of light emitting weights for subfields is inappropriate, the dynamic resolution characteristic cannot be improved.

Generally, when one field is divided into M subfields, and light emitting weights corresponding to powers of 2 are allotted to the subfields, gradation representation can be made to the maximum level $2^M$. However, if light emitting weights which are not powers of 2 are allotted to the subfields or the subfields are divided so as to perform processing to remove false contour, characteristic of the subfield method, the number L of display gray scale levels for each pixel, with respect to the number M of the subfields, is less than $2^M$. That is, the number of subfields increases to realize the same display gray scale level. In this manner, when the number of subfields has increased, light emission is dispersedly performed within one field, which degrades the dynamic resolution.

SUMMARY OF THE INVENTION

Accordingly, an object of the present invention is to solve the problems of the above-described conventional techniques and to provide a color image display apparatus with an excellent dynamic resolution characteristic, which displays a high-quality moving image where color fringes at moving image edge portions are inconspicuous. Another object of the present invention is to provide an image display apparatus which attains higher image quality by using the false-contour interference reducing method.

To attain the foregoing objects, the present invention provides the following constructions:

(1) The time response characteristics of light emission by red, green and blue light emitting cells correspond to respective red, green and blue colors.

This construction provides a color image display apparatus which displays a high-quality moving image where color fringes at moving image edge portions are inconspicuous.

(2) Assuming that the time response characteristics of light emission by red, green and blue light emitting cells have values TR, TG and TB, the difference between the values TR and TG is sufficiently less than that between the values TR and TB and that between the values TG and TB.

This construction reduces the degradation of image quality due to color fringing and enables high-quality moving image display, since color fringing occurs in an inconspicuous color of blue or yellow of low spectral luminous efficacy at moving image edge portions.

(3) Light emitting weights allotted to respective subfields are arranged such that the light emitting weight increases from the head and the end of the light emitting weight array toward the center.

This construction substantially concentrates light emission in a short period, which reduces the degradation of the resolution in moving image display, and enables high-quality moving image display.

(4) Among a plurality of subfields, light emitting weights [N], [2·N], [3·N] . . . [(K−1)·N], [K·N], [(k−1)·N], . . . [2·N] and [N] (K, N: natural numbers) are allotted to 2·K−1 upper subfields.

This construction disperses "light emission changeover" when the gray scale level continuously changes without concentrating the light emission changeover at a particular gray scale level, thus simultaneously enables acquisition of excellent dynamic resolution characteristic and reduction of false contour interference.

(5) Light emitting weights array for subfields are arranged such that light emitting luminance has two peaks in one field period, and time interval between the light emitting luminance peaks is ½ of the one field.

This construction increases a light-emission pattern repetitive period to a period substantially twice of a field frequency, thus reduces flicker interference and false contour interference.

(6) In addition to the construction (5), the persistence time of green and red light emitting cells is substantially ½ of the field frequency or longer than ½ of the field frequency.

This construction smoothes light emission by light emitting response characteristics of the light emitting cells, thus reduces false contour interference and displays a high-quality moving image.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

FIG. 3 is an explanatory view showing color fringing at moving image edge portions;

FIGS. 4A and 4B are explanatory views showing color fringing at moving image edge portions;

FIG. 5 is an explanatory view showing a conventional v-shaped light-emission type subfield arrangement;

FIGS. 6A and 6B are an explanatory view and a graph showing a light emitting weight array in the v-shaped light-emission type subfield arrangement;

FIGS. 9A and 9B are explanatory views showing the color fringing at moving image edge portions in a conventional device;

FIG. 10 is an explanatory view showing an example of the subfield arrangement according to the embodiment of the present invention;

FIG. 16 is a table showing a first light emission control pattern;

FIG. 17 is a table showing a second light emission control pattern;

FIGS. 18A and 18B are an explanatory view and a graph showing a light emission pattern in the subfield arrangement of the present invention;

FIG. 19 is an explanatory view showing another subfield arrangement of the display apparatus of the present invention;

FIG. 20 is an explanatory view showing another subfield arrangement of the display apparatus of the present invention;

DETAILED DESCRIPTION OF THE PREFERRED EMBODIMENTS

Preferred embodiments of a color image display apparatus of the present invention will now be described in detail in accordance with the accompanying drawings.

Figure 1:
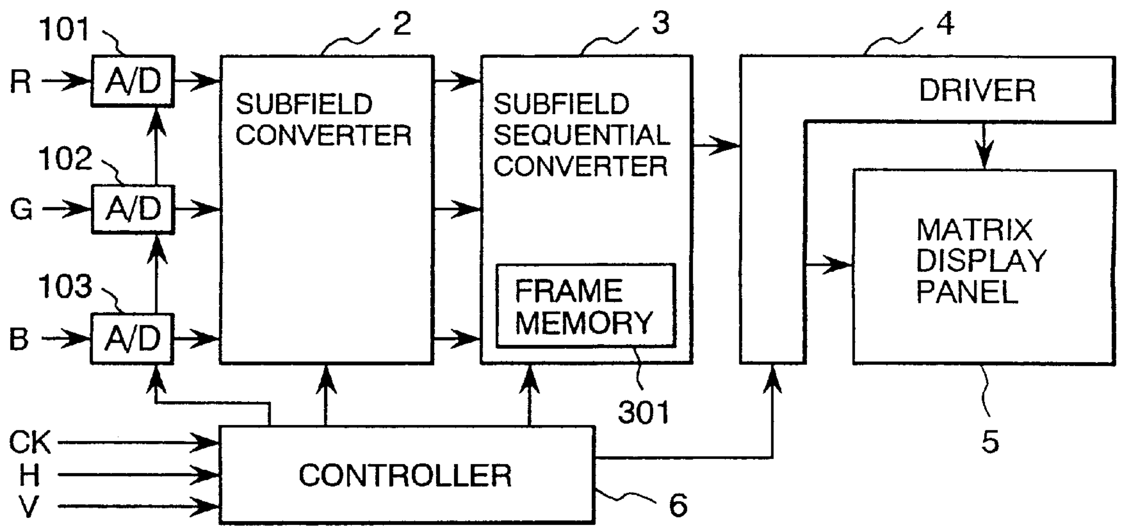
FIG. 1 is a block diagram showing a color image display apparatus according to an embodiment of the present invention.

FIG. 1 is a block diagram showing the arrangement of significant parts of the color image display apparatus according to an embodiment of the present invention. A/D converters 101 to 103 respectively convert R, G and B analog video signals into digital signals. A subfield converter 2 converts the A/D-converted digital signals into subfield data indicative of on/off of light emission in respective subfields. A subfield sequential converter 3 converts the subfield data represented in pixel units into area sequential data in subfield units. A frame memory 301 is a storage area provided in the subfield sequential converter 3 to realize area sequential conversion in bit units.

A driver 4 additionally inserts a drive pulse into the signal of area sequential data in subfield units, and outputs a voltage (or a current) to drive a matrix display panel 5. A controller 6 generates control signals necessary for the respective circuits based on a dot clock CK as timing information of the input video signal, a horizontal synchronizing signal H, a vertical synchronizing signal V and the like.

In this construction, the A/D converters 101 to 103 respectively convert the input R, G and B video signals into digital signals. The digital signals are based on general binary representation. Each bit has a weight corresponding to a power of 2. More specifically, when each video signal is quantized into an 8-bit signal (b0 to b7), the least significant bit b0 has a weight "1", the bit b1, a weight "2", the bit b2, a weight "4". The bit b7 has a weight "128".

The subfield converter 2 converts the digital signals into subfield data indicative of on/off of light emission in the respective subfields. The subfield data comprises bits of information corresponding to the number of subfields. If display is made with eight subfields, the information consists of eight bits S0 to S7. The bit S0 indicates whether or not light emission is performed at a corresponding pixel during the light emission period of the head subfield SF0. Similarly, the bit information S1, S2, .... S7 indicate on/off of light emission in the subfields SF1, SF2, . . . S7.

The subfield sequential converter 3 inputs the subfield data, and writes the data into the frame memory 301 in pixel units. The data is area-sequentially read from the frame memory 301 in subfield units. That is, when the bit S0 indicative of on/off of light emission during the period of the subfield SF0 has been read for one field, the bit S1 indicative of on/off of light emission during the period of the subfield SF1 is read for one field. Then, similarly, the bits S2, S3 . . . S7 are sequentially read. The driver 4 performs necessary signal conversion, pulse insertion or the like for driving display devices, and drives the matrix display panel 5.

Figure 2:
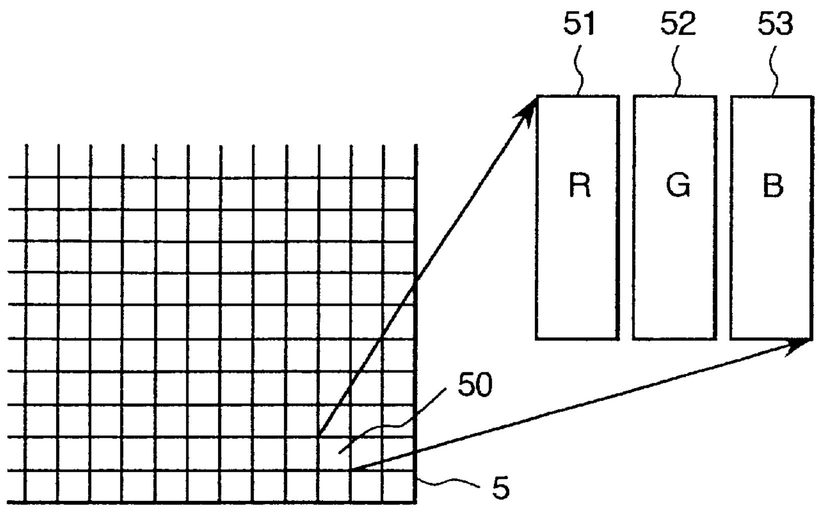
FIG. 2 is an explanatory view showing the structure of a matrix display panel 5 in FIG. 1.
Figure 7A:
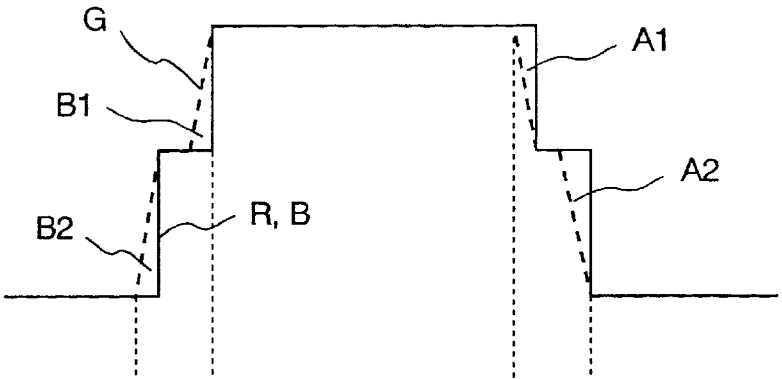
FIGS. 7A and 7B are explanatory views showing degradation of dynamic resolution in the v-shaped light-emission type subfield arrangement.
Figure 7B:
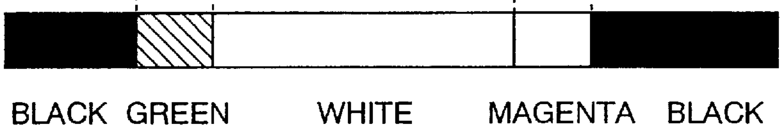

As shown in FIG. 2, the matrix display panel 5 has pixels 50, corresponding to the number of effective display pixels unique to the panel, arranged into matrix. For example, in a display panel having horizontal 640 pixels and vertical 480 pixels, the pixels 50 are arranged in matrix of 640 (horizontal) 480 (vertical) pixels.

Each pixel 50 consists of R (red), G (green) and B (blue) color light emitting cells 51 to 53. Color image display is made by controlling these light emission of three RGB primary colors.

In the color image display apparatus of the present invention, the light emitting cells 51 to 53 are formed by using light emitting materials such that the light emitting response characteristics of the R (red) and G (green) light emitting cells are substantially equal to each other in comparison with the light emitting response characteristic of the B (blue) cell. As one specific example, the persistence time of the green (G) light emitting cell 52 is 12 to 17 ms, that of the red (R) light emitting cell 51 is 8 to 13 ms, and that of the blue (B) light emitting cell 53 is 1 ms or shorter.

In this manner, as the R persistence time is substantially equal to the G persistence time, even though the R, G and B light emitting response characteristics do not completely coincide, the influence of color fringing can be reduced. Hereinbelow, this advantage will be described with reference to FIGS. 8A and 8B.

Figure 8A:
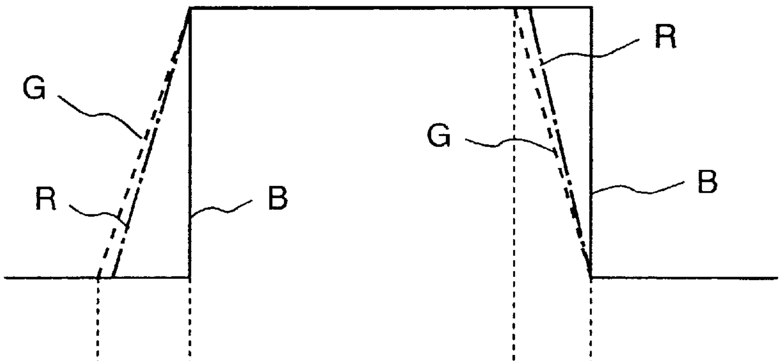
FIGS. 8A and 8B are explanatory views showing color fringing at moving image edge portions in the present invention.
Figure 8B:
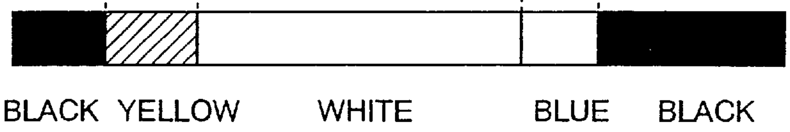

FIGS. 8A and 8B show color fringing which occurs at edge portions when the white rectangular pattern on black background in FIG. 3 is displayed on the color image display apparatus of the present invention. As the blue (B) light emitting cell has a fast light emitting response, a rectangular pattern represented with the solid line in FIG. 8A is perceived. On the other hand, as represented with the broken line and the alternate long and short dashed line, the R (red) and G (green) light emitting cells have substantially-equally delayed characteristics. As a result, color fringing occurs at each edge portions as a blue (=white−red−green) color fringe (motion front fringe) due to substantially-equally delayed R (red) and G (green) light emitting responses, and a yellow (=red+green) color fringe (motion rear fringe) due to R (red) and G (green) persistence.

The spectral luminous efficacy of the blue color fringe occurred as the front fringe is lower than the spectral luminous efficacy of the red color fringe and that of the green color fringe, therefore, it is inconspicuous as interference. Further, as color fringing concentrates at edge portions, it occurs in a contour-type narrow area. In human perceptional characteristics, the color resolution characteristic for change on a blue-yellow axis (B-Y axis) is the lowest. As the blue and yellow color fringing occur in a narrow area on edges have high resolution information, they are not easily detected due to the low resolution characteristic.

In this manner, by constructing the light emitting cells such that the R persistence time is substantially equal to the G persistence time, even though the R, G and B light emitting response characteristics do not completely coincide, color fringing can be inconspicuous. This construction enables high-quality image display.

Note that in the present embodiment, the persistence time of the R light emitting cell and that of the G light emitting cell, having light emitting response characteristics substantially equal to each other, are longer than that of the B light emitting cell, however, the R persistence time and the G persistence time may be shorter. For example, it may be arranged such that the R persistence time and the G persistence time are 5 to 7 ms and the B persistence time is 10 to 15 ms. In this case, color fringing occurs at edge portions as a yellow (=white−blue) motion front fringe and blue motion rear fringe. Thus, the advantage similar to that in the above embodiment can be obtained.

Next, for the purpose of comparison with the advantage of the present invention, the operation in a case where the light emitting cells 51 to 53 are constructed such that the R (red) and B (blue) light emitting response characteristics are substantially equal to each other, in comparison with the G (green) light emitting response characteristic, will be described with reference to FIGS. 9A and 9B. More specifically, the persistence time of the G (green) light emitting cell 52 is 12 to 17 ms, on the other hand, that of the R (red) light emitting cell 51 is 3 to 5 ms and that of the B (blue) light emitting cell 53 is 1 ms or shorter.

As it is understood from the response characteristics in FIGS. 9A and 9B, color fringing occurs as a magenta (=white−green) color fringe (motion front fringe) due to greatly delayed G (green) light emission and a green fringe (motion rear fringe) due to the G (green) persistence. In comparison with the response characteristics in FIGS. 8A and 8B, the spectral luminous efficacy of green is higher than that of blue and that of red. Accordingly, the green color fringe is conspicuous and it easily becomes interference. Further, the green and magenta color fringes both have color resolution characteristics close to a red-cyan axis (R-C axis) with the highest and sensitive color resolution characteristic. As the green and magenta color fringes have higher resolution characteristics in comparison with those of the color fringes on the blue-yellow axis (B-Y axis), the interference is easily detected.

As described above, in comparison with the case where the R and B light emitting response characteristics are substantially equal to each other, color fringing can be greatly reduced by arranging such that the R and G light emitting response characteristics are substantially equal to each other.

Further, it may be arranged such that the B and G light emitting response characteristics are substantially equal to each other. In this case, a cyan (=blue+green) or red (=white−blue−green) color fringe occurs. This color fringe is more conspicuous in comparison with the yellow and blue color fringes as shown in FIGS. 8A and 8B.

Ideally, the R, G and B light emitting cells have uniform time response characteristics, and image display can be made without color fringing at any moving image edge. However, even though the R, G and B light emitting response characteristics do not completely coincide, if at least G and B light emitting time response characteristics are substantially equal to each other, occurred color fringing can be inconspicuous, and high-quality moving image display can be performed.

In practice, it is difficult to arrange such that the G and R light emitting time response characteristics are completely equal to each other. If the difference in light emitting response time between the G and R light emitting cells is less than that between the G and B light emitting cells, and that between the R and B light emitting cells, color fringing at each edge portion occurs as an almost blue or yellow fringe. This obtains the advantage of interference reduction by the present invention. The time response characteristics of the light emitting cells are represented by using persistence time values as representative characteristic values, as follows.

Assuming that the red (R) cell persistence time is denoted by TR, the green (G) cell persistence time, by TG, and the blue (B) cell persistence time, by TB, the difference between the persistence time values TR and TG is sufficiently less than that between the values TB and TR and that between the values TB and TG. In other words, if the respective persistence time values TR, TG and TB satisfy the following expressions, the advantage of color fringing reduction can be obtained.

$$|TR-TG|<|TR-TB| \text{ and}$$

$$|TR-TG|<|TG-TB|$$

The materials (fluorescent substances and the like) constructing the light emitting cells must satisfy various basic conditions such as chromaticity coordinates of RGB primary colors, white balance condition and luminous efficiencies. For moving image display, in addition to these conditions, the time response characteristics of the R, G and B light emitting cells must be uniform. However, in the present display apparatus, only the G (green) and R (red) light emitting time response characteristics are taken into consideration. Therefore, the materials of light emitting cells can be selected from a greater variety of materials. In comparison with the conventional display devices, light emitting cell materials of higher luminance or higher color purity can be employed. Thus, a higher-quality display apparatus can be provided.

Further, in the plasma display device or the like having different light emitting principle from that of the CRT as a conventional display device, new fluorescent materials and the like must be developed. However, on the premise that the present invention is applied to the plasma display device, the materials of the light emitting cells can be selected from a greater variety of materials. Further, economic effects can be expected from the reduction of material developing period and the like.

Next, an embodiment to reduce the degradation of resolution in moving image display by the arrangement of the light emitting weight array for the subfields will be described. The array of light emitting weights for the subfields is determined by the subfield converter 2 that on/off controls light emission in the respective subfields.

In this embodiment, to avoid degradation of dynamic resolution characteristic, the array of light emitting weights for the subfields is made as shown in FIG. 10. In FIG. 10, array of the light emitting weights is constructed to obtain angular(or shape)light emission distribution where the light emitting weight decreases from the center toward the head and end of the field by arranging the subfield SF4 with the maximum light emitting weight (luminance) at about the center of one field.

More specifically, in the present embodiment, light emitting weights 1, 4, 16, 64, 128, 32, 8 and 2 are allotted to the eight subfields SF0 to SF7 in one field. All the light emitting weights are powers of 2, accordingly, the order of bits in A/D converted binary data can be changed in correspondence with the subfield data to on/off control light emission in the subfields.

Figure 11A:
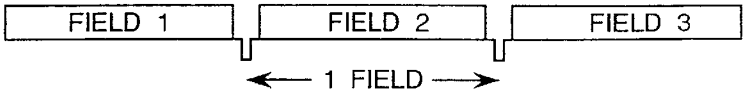
FIGS. 11A and 11B are an explanatory view and a graph showing an angular light-emission type subfield arrangement in the embodiment of the present invention.
Figure 11B:
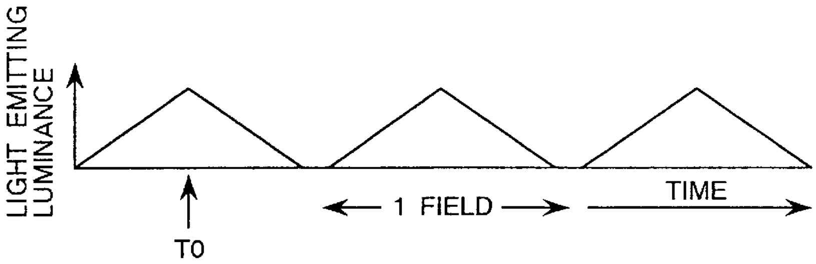

FIGS. 11A and 11B show time change of light emitting luminance in the respective fields in display based on a video signal by subfield data with the array of light emitting weights in FIG. 10. The respective fields have the array of light emitting weights for angular light-emission distribution as shown in FIG. 10, in which the light emission concentrates at about the center of the field (T0 in FIG. 11B). In the gray scale representation display based on the subfield method, it is impossible on the principle to perform impulse light emission such that the light emitting luminance concentrates in a short period. However, the angular light-emission type subfield arrangement enables light emission substantially in a short period without dispersing the light emission in the field.

Note that the array of light emitting weights for the subfields is not limited to that in FIG. 10, but any array of light emitting weights may be employed so long as it is an angular type arrangement where the light emission increases from the head and the end of each field toward the center. For example, the array of light emitting weights in FIG. 10 may be reversed on the time base such that light emitting weights 2, 8, 32, 64, 16, 4 and 1 are allotted to the subfields SF0 to SF7.

Next, another embodiment will be described with reference to FIG. 12, in which a subfield with a heavy light emitting weight is further divided into plural subfields so as to reduce false contour interference as a problem in moving image display based on the subfield method.

Figure 12:
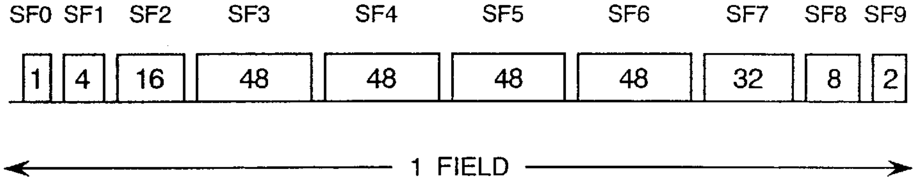
FIG. 12 is an explanatory view showing another subfield arrangement of the present invention.

In FIG. 12, the light emitting luminance of the two upper subfield bits SF4 (light emitting weight=128) and SF3 (light emitting weight=64) of the array of light emitting weights in FIG. 10 are added and divided by 4. Thus, the light emitting luminance is diffused in four subfields respectively allotted light emitting weight 48 (=(128+64)/4). The array of light emitting weights for the subfields obtains a trapezoidal shaped light emission.

In use of this trapezoidal light-emission type light emitting weight array, the same advantage as described above can be attained by arranging the subfields with the maximum light emitting luminance (SF3 to SF6) at the center of the array, and arranging the other subfields such that the light emitting luminance decreases toward the head and end of the field.

In this case, if light emitting weights for the subfields are powers of 2 as described above, in continuous gradation variation, so-called "light emission changeover" which occurs at a specific gray scale level, as a phenomenon that light emission stops in a certain subfield and light emission starts in the other subfields, concentrates on a specific change point. This disturbs light emission periodicity and causes false contour interference.

For example, in the array of light emitting weights in FIG. 10, at the 127th gray scale level, light emission is performed in all the subfields except the subfield SF4; at the 128th gray scale level, light emission is performed only in the subfield SF4. The light emission changeover concentrates at the point where the display gray scale level changes from the 127th level to the 128th level.

In the embodiment described below, to effectively reduce the above-described false contour interference, the light emitting weights for the subfields are not powers of 2, but they are determined based on the following three conditions.

(1) The light emitting weights for the group of upper subfields are not powers of 2.

(2) Let N and K be natural numbers, light emitting weights N, 2·N, 3·N . . . (K−1) N, K·N, (K−1) N . . . 2·N and N are allotted to 2·K−1 upper subfields.

(3) The upper subfields are arranged such that the (K−1)·N subfield with the maximum light emitting luminance is at the center to obtain symmetrical angular light emission.

Figure 13:
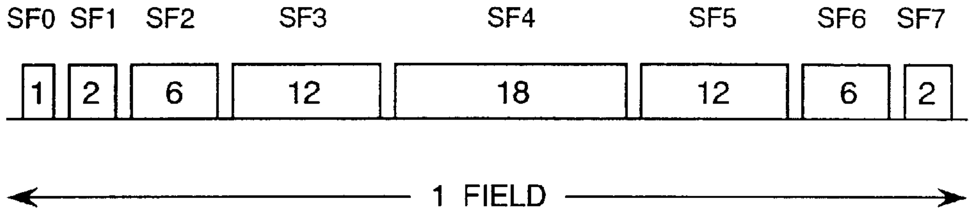
FIG. 13 is an explanatory view showing another subfield arrangement of the present invention.

In the array of light emitting weights as shown in FIG. 13, five subfields SF2 to SF6 are upper subfields. The light emitting weights for the upper subfields are determined, as N=6 and K=3, to be 6 (N), 12(=2·N), 18 (=K·N), 12 (=2·N) and 6(=N).

Figure 14:
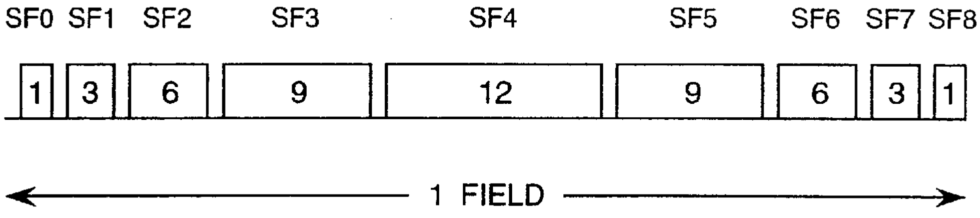
FIG. 14 is an explanatory view showing another subfield arrangement of the present invention.
Figure 15:
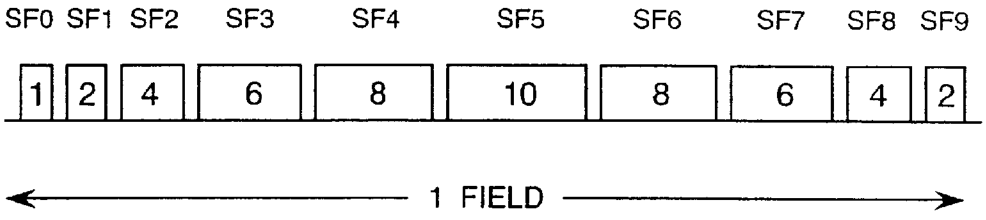
FIG. 15 is an explanatory view showing another subfield arrangement of the present invention.

Similarly, in the array of light emitting weights as shown in FIG. 14, seven subfields SF1 to SF7 are upper subfields. In this case, light emitting weights are determined, as N=3 and K=4. Similarly, in the light emitting weight array as shown in FIG. 15, nine subfields SF1 to SF9 are upper subfields. In this case, light emitting weights are determined, as N=2 and K=5.

Next, description will be made on a method for gradation representation in use of the array of light emitting weights which are not powers of 2, and the advantage of reduction of false contour interference, with reference to FIG. 16. FIG. 16 shows a first light emission control pattern for representation with respective gray scale levels by the subfield arrangement with the array of light emitting weights in FIG. 13.

As shown in FIG. 16, representation with 5 (=1+2+2) gray scale levels is possible by the combination of the light emitting weights 1, 2 and 2 for the lower subfields SF0, SF1 and SF7. Further, representation with gray scale levels of a multiple of 6 is possible in the upper subfields SF2, SF6, SF3, SF5 and SF4. Thus, continuous gradation can be represented by combining the upper and lower subfields.

In the upper subfields, even if the gradation changes from the 6th gray scale level to the 12th gray scale level, from the 12th gray scale level to the 18th gray scale level, from the 18th gray scale level to the 24th gray scale level, . . . , light emission is continuously performed at least one upper subfield over two or more gray scale levels. By this control, even if the gradation continuously changes, the above-described "light emission changeover" can be dispersed without concentrating the phenomenon at a specific gray scale level.

In this manner, the excellent dynamic resolution characteristic by the angular light-emission distribution and the reduction of false contour interference can be simultaneously attained by arranging the subfields as shown in FIGS. 13 to 15, and a high-quality image display apparatus can be realized.

Note that as described in FIGS. 13 to 15, the upper subfields are symmetrically arranged with a subfield with the maximum light emitting luminance at the center in the field. For example, in the subfield arrangement in FIG. 13, the subfields SF3 and SF5 with light emitting weights 12, and the subfields SF2 and SF6 with light emitting weights 6, are arranged symmetrically, with the subfield SF4 with the maximum light emitting weight 18 as the central subfield.

In this arrangement, as the subfields with the same light emitting weights (SF3 and SF5, and SF2 and SF6) are symmetrically arranged, even if light emission on/off control positions are exchanged, the same gradation can be represented. The light emission periodicity can be more random by changing the array of light emitting weights as above at field/line/pixel periods. This reduces false contour interference.

More specifically, a second light emission control pattern as shown in FIG. 17 is prepared in addition to the first light emission control pattern in FIG. 16. In the second light emission control pattern, the subfields SF3 and SF5 are replaced with the subfields SF2 and SF6. Then, the subfield converter 2 changes the respective light emission control patterns in field/line/pixel units.

Note that the timings for changing the light emission control patterns are not necessarily as above, however, the light emission control patterns may be changed at each pixel in correspondence with its position. For example, in case of a checker-flag pixel matrix pattern, the light emission patterns may be changed at each white pixel position and at each black pixel position. Further, one light emission control pattern for white pixels and the other light emission control pattern for black pixels may be changed for each field.

The above-described subfield arrangements of the present invention obtain angular light-emission distribution by arranging a subfield with the maximum light emitting luminance at about the center of one field period, as shown in FIG. 11. This means that a set of light emission having the angular light-emission distribution is performed once in one field. If a large number of subfields can be set within one field period, it may arranged such that the angular light-emission distribution is performed twice in one field period, as shown in FIG. 18.

In the light emission distribution having two peaks in one field as shown in FIG. 18, the light emitting luminance is low around the boundary between fields. This arrangement reduces the problem in the conventional v-shaped light emission distribution, i.e., mixture of field data with that of adjacent data, similarly to the single-peak angular light-emission type subfield arrangement. Accordingly, the degradation of resolution in moving image display can be reduced.

Further, as the interval between two subfields corresponding to the two light emission peaks is set to substantially ½ of one field period, the interval between the second light emission peak in one field and the first light emission peak in the next field is ½ of the one field period. Thus, the light emission distribution of the display with the double-peak light-emission type subfield arrangement is substantially equivalent to display in a twice frequency (single-peak (angular) light-emission type subfield arrangement). This reduces occurrence of flicker.

Further, as the plural upper subfields with high light emitting luminance are divided so as to form two light emission peaks, the representable gradation with the divided subfields (only coarse gradation by a small number of gray scale levels can be represented) is displayed in the twice field frequency. Further, as the first and second peaks are obtained by substantially the same subfield arrangement, gradation can be briefly represented (the maximum light emitting luminance is ½) only by the subfield arrangement for one of these peaks. By this construction, light emission dispersedly made in the subfields in one field period is equivalent to light emission concentrated in a substantially ½ field period. Thus, false contour interference can be reduced.

Further, in a case where the persistence time of a fluorescent substance is equal to or longer than the ½ field (8.3 ms), the persistence characteristic uniforms light emission in the respective subfields, thus further improves the advantage of reduction of false contour interference. The persistence time of the fluorescent substance is preferably ½ or longer than one field in all the RGB light emitting devices, however, the above advantage can be greatly improved so long as the persistence time of G (green) color and that of R (red) color with high spectral luminous efficacy are substantially 8.3 ms or longer.

Next, the subfield arrangements to realize the double-peak type light emission distribution will be described with reference to FIGS. 19 to 22.

FIG. 19 shows a subfield arrangement using nine subfields SF0 to SF8 for display in 64 level representation. In this arrangement, with respect to the subfields with 6-bit (64 levels) natural binary light emitting weights 32, 16, 8, 4, 2 and 1, the upper three subfields with the weights 32, 16 and 8 are respectively divided into two subfields. That is, the subfields SF2 and FS7 are respectively allotted a light emitting weight 16 which is ½ of the light emitting weight 32; the subfields SF3 and SF8 are respectively allotted a light emitting weight 8 which is ½ of the light emitting weight 16; and the subfields SF1 and SF6 are respectively allotted a light emitting weight 4 which is ½ of the light emitting weight 8. Further, the interval between the peak of the light emission in the subfield SF2 and that in the subfield SF7 is substantially ½ of one field.

FIG. 20 shows a subfield arrangement using ten subfields SF0 to SF9 for display in 80 level representation.

This arrangement is based on the subfield arrangements in FIGS. 13 to 15. The light emitting weights are determined, as N=16, and K=2, to be 32, 16, 16, 8, 4, 2 and 1. With respect to these light emitting weights, the upper three subfields with the light emitting weights 32, 16 and 16, are respectively divided into two subfields. That is, the subfields SF2 and SF7 are respectively allotted a light emitting weight 16 which is ½ of the light emitting weight 32; the subfields SF1 and SF6 are respectively allotted a light emitting weight 8 which is ½ of the light emitting weight 16; and the subfields SF3 and SF8 are respectively allotted a light emitting weight 8 which is ½ of the light emitting weight 16. Similar to the arrangement in FIG. 19, the interval between the peak of light emission in the subfield SF2 and that in the subfield SF7 is substantially ½ of one field. Note that in FIG. 20, in addition to the advantage that the light emission changeover upon gray-scale level change is dispersed as shown in FIGS. 13 to 15, the double peak arrangement reduces false contour. Thus, a display apparatus which displays a higher-quality moving image can be realized.

Figure 21:
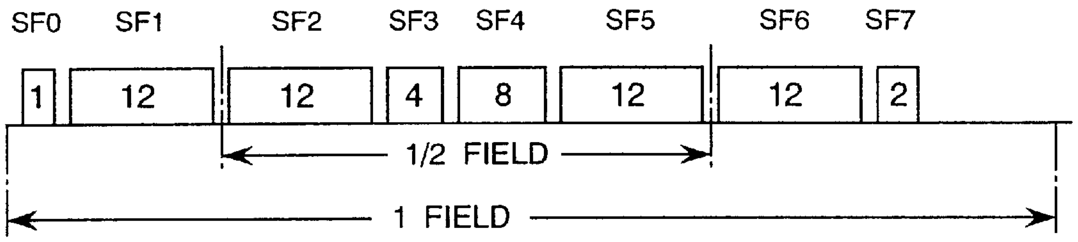
FIG. 21 is an explanatory view showing another subfield arrangement of the display apparatus of the present invention.

FIG. 21 shows a subfield arrangement using eight subfields SF0 to SF7 for display in 64 level representation. In this arrangement, with respect to 6-bit (64 levels) natural binary light emitting weights 32, 16, 8, 4, 2 and 1, the upper two subfields with the light emitting weights 32 and 16 are combined and divided by 4 ((32+16)/4=12). Accordingly, the subfields with the maximum light emitting luminance are SF1, SF2, SF5 and SF6. Different from the arrangements in FIGS. 19 and 20, the arrangement in FIG. 21 has four subfields with the maximum light emitting luminance. This arrangement obtains "double-peak" light-emission distribution as shown in FIG. 18 by two pairs of adjacent subfields. Further, the interval between the two light emission centers, i.e., the center of emission by the subfields SF1 and SF2 and the center of emission by the subfields SF5 and SF6, is substantially ½ of one field.

Figure 22:
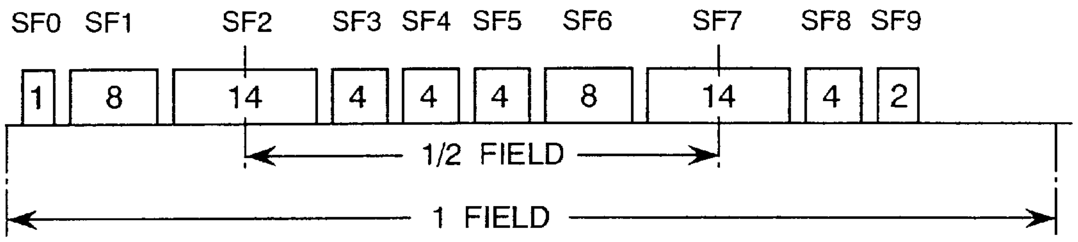
FIG. 22 is an explanatory view showing another subfield arrangement of the display apparatus of the present invention.

FIG. 22 shows a subfield arrangement using ten subfields SF0 to SF9 for display in 64 level representation. In this arrangement, with respect to 6-bit (64 levels) natural binary light emitting weights 32, 16, 8, 4, 2 and 1, the upper subfield with the maximum light emitting weight 32 is divided into three subfields, and the subfields with the light emitting weights 16 and 8 are divided into two subfields. That is, the subfields SF2 (weight=14), SF5 (weight=4) and SF7 (weight=14) are obtained from the subfield with the light emitting weight 32 (14+4+14=32). The subfields SF1 and SF6 are respectively allotted a light emitting weight 8 which is ½ of the light emitting weight 16. The subfields SF3 and SF8 are respectively allotted a light emitting weight 4 which is ½ of the light emitting weight 8. Further, the interval between the light emission peak in the subfield SF2 and that in the subfield SF7 is substantially ½ of one field. In this manner, subfields with light emitting weights which are not powers of 2 are formed by dividing a subfield into three subfields. This arrangement disperses false contour interference, due to light emission changeover in subfields at around a gray scale level which is a power of 2, at other gray scale levels.

In the subfield arrangements in FIG. 19 to 22, the subfields with high light emitting luminance, positioned corresponding to the centers of the two light emission peaks in one field period, are divided into plural subfields. For example, in the arrangement in FIG. 19, the subfields SF1 to SF3 for the first peak and the subfields SF6 to SF8 for the second peak are obtained by dividing the three upper bits with natural binary light emitting weights (32, 16 and 8) by 2. This means that rough gradation representation by 8 gray scale levels is made by display in a twice field frequency. This effectively reduces flicker and false contour.

The subfield arrangements in FIGS. 19 to 22 mainly show the arrangements of light emitting weights. Actually, in light emission, address processing, initialization of light emitting devices and the like are performed. In consideration of these additional signals, the subfield arrangement is made such that the interval between two subfields for the light emission peaks (the interval from the first center of light emission to the second center of light emission) is substantially ½ of one field. Some systems require a period for address processing, initialization of the light emitting devices and the like longer than a period for light-emission holding pulses to determine light emitting weights. In these systems, 1 is subtracted from ½ of the total number of subfields, and subfields in the obtained number are inserted between two subfields with the maximum light emitting luminance. More specifically, in case of ten subfields, four subfields are inserted between the two subfields with the maximum light emitting luminance; an in case of eight subfields, three subfields are inserted between the two subfields with the maximum light emitting luminance. If the total number of subfields is an odd number, a blanking period corresponding to one subfield is added, and one subfield with light emitting weight 0 is added to the total number of subfields, then the resulting even total number of subfields is processed. Otherwise, without adding the blanking period, 1 is added to the total number of subfields, and subfields in a number obtained by subtracting 1 from ½ of the total number of subfields are arranged between the subfields with the maximum light emitting luminance. At this time, by selecting subfields with low light emitting luminance so as to be arranged between the subfields with the maximum light emitting luminance, the light emission interval between the two subfields with the maximum light emitting luminance can be close to ½ of one field. Further, it may be arranged such that the interval between the two subfields with the maximum light emitting luminance is ½ of one field by these methods and by controlling a blanking period for light emission off status. Note that light emission can be concentrated by inserting the blanking between one adjacent fields (end or head of each field). This reduces degradation of resolution and false contour interference in a moving image.

Note that the subfield arrangements are not limited to the above arrangements but any arrangement may be employed so long as it provides double-peak light emission distribution in one field period and the interval between the light emission peaks is ½ of the field, as shown in FIGS. 18A and 18B. For example, in the arrangement in FIG. 19, even if the subfields SF0 to SF8 are reversed, or the subfields SF1, SF8 are replaced with the subfields SF6, SF8, the same advantage can be obtained.

As described above, flicker and false contour interference can be further reduced by the double-peak light-emission type subfield arrangement utilizing the feature of the single-peak angular light-emission type subfield arrangement as shown in FIG. 11. Further, by arranging such that time response characteristics of R (red) light emitting device and G (green) light emitting device are substantially equal to each other as in the double-peak light-emission type subfield arrangements, a high-quality moving image can be displayed with reduced interference such as color fringing at moving image edges.

Note that the double-peak light-emission type subfield arrangements as shown in FIGS. 19 to 22 respectively have two light emission peaks by dividing an upper subfield with high light emitting luminance into a plurality of subfields. Accordingly, the number of subfields is greater than the necessary least number of subfields for gradation representation (e.g., 6 subfields for 64 level representation). If the resolution is high but the total number of subfields is small, the single-peak angular light-emission type subfield arrangement may be employed, while if the resolution is relatively low but the total number of subfields is large, the double-peak light-emission type subfield arrangement may be employed.

As it is apparent from the above description, the advantages provided by the present invention are as follows.

(1) As the light emitting response characteristics of R and G light emitting cells are substantially equal to each other, the degradation of image quality by e.g. color fringing at moving image edge portions is reduced. Thus, a color image display apparatus which displays a high-quality moving image can be realized.

(2) As the array of light emitting weights for subfields is arranged to obtain angular light-emission distribution where light emission concentrates at the center of the field, the degradation of image quality in moving image display is reduced. Thus, a color image display apparatus which displays a high-quality moving image can be realized.

(3) As the light emitting response characteristics of R and G light emitting cells are substantially equal to each other, and the array of light emitting weights for subfields is arranged to obtain angular light-emission distribution where light emission concentrates at the center of the field, a color image display apparatus with an excellent dynamic resolution characteristic, which displays a high-quality moving image with reduced color fringing at moving image edge portions, can be realized.

(4) The array of light emitting weights for subfields is arranged to obtain angular light-emission distribution where light emission concentrates at the center of the field, and "light emission changeover" when the gray scale level continuously changes does not occur at a specific gray scale level but it occurs dispersedly. Accordingly, a high-quality color image display apparatus which simultaneously attains acquisition of excellent dynamic resolution characteristic and reduction of false contour interference can be realized.

(5) As the array of light emitting weights for subfields is arranged to obtain double-peak light-emission distribution having two peaks in one field period, and interval between the two light emitting luminance peaks is ½ of the field, flicker and false contour interference can be reduced.

(6) As the light emitting response characteristics of the R and G light emitting cells are substantially equal to each other, and the array of light emitting weights for subfields is arranged to obtain double-peak light-emission distribution having two peaks in one field period, a color image display apparatus with an excellent dynamic resolution characteristic, which displays a high-quality moving image where color fringing at moving image edge portions, can be realized.

As many apparently widely different embodiments of the present invention can be made without departing from the spirit and scope thereof, it is to be understood that the invention is not limited to the specific embodiments thereof. The scope of the present invention is defined in the appended claims, and various changes within the scope of the claims may be resorted to without departing from the spirit and scope of the invention.

What is claimed is:

1. A display apparatus for displaying an image having gradation represented by subfields comprising:

a display panel;

a circuit for outputting information in which a plurality of subfields in one field period is arranged so as to have first plural array portions where allotted light emitting weights increase gradually and second plural array portions where allotted light emitting weights decrease gradually; and a driver for forming a drive signal based on said information and for outputting said drive signal to said display panel.

2. A display apparatus for displaying an image having gradation represented by subfields comprising:

a display panel;

a circuit for outputting information in which a plurality of subfields in one field period is arranged so as to have first plural array portions where allotted light emitting weights increase gradually and second plural array portions where allotted light emitting weights decrease gradually, both of said first and second plural array portions being arranged alternatively; and a driver for forming a drive signal based on said information and for outputting said drive signal to said display panel.

3. A display apparatus for displaying an image having gradation represented by subfields comprising:

a display panel;

a circuit for outputting information in which a plurality of subfields in one field period having plural subfields allotted light emitting weights equal to each other is arranged so as to have plural groups having first plural array portions where allotted light emitting weights increase gradually and second plural array portions where allotted light emitting weights decrease gradually, and said subfields having light emitting weights equal to each other are allotted to said groups; and a driver for forming a drive signal based on said information and for outputting said drive signal to said display panel.

4. A display apparatus according to claim 3, wherein a subfield having a maximum light emitting weight is included in each of said groups.

5. A display apparatus according to claim 3 or 4, wherein said subfields having said light emitting weights equal to each other are separately arranged in a first half and a second half in one field period.

6. A display apparatus for displaying an image having gradation represented by subfields comprising:

a display panel;

a circuit for outputting information in which a plurality of subfields in one field is arranged so as to have first plural array portions where allotted light emitting weights increase gradually and second plural array portions where allotted light emitting weights decrease gradually, both of said first and second plural array portions being arranged alternatively, and a maximum light emitting weight is included in said first plural array portions and said second plural array portions; and a driver for forming a drive signal based on said information and for outputting said drive signal to said display panel.

7. A display apparatus according to claim 6, wherein an interval of said subfields having said maximum light emitting weight is substantially ½ of one field.

8. A display apparatus for displaying an image having gradation represented by subfields comprising:

a display panel;

a circuit for outputting information in which light emitting weights [N], [2·N], [3·N], . . . , [(K–1)·N], [K·N], [(K–1)·N], . . . , [2·N], [N] (K, N:natural numbers), where K is a natural number of at least 3) are arranged so as to be allotted to 2·K–1 subfields including a maximum light emitting weight among a plurality of subfields in one field period; and a driver for forming a drive signal based on said information and for outputting said drive signal to said display panel.

9. A display apparatus for displaying an image having gradation represented by subfields comprising:

a display panel;

a circuit for outputting information in which a plurality of subfields in one field period is arranged so as to have first plural array portions where allotted light emitting weights increase gradually and second plural array portions where allotted light emitting weights decrease gradually, and in which light emitting weights [N], [2·N], [3·N], . . . , [(K–1) N], [K·N], [(K–1) N], . . . , [2·N], [N] (K, N:natural numbers, where K is a natural number of at least 3) are arranged so as to be allotted to 2·K–1 subfields including a maximum light emitting weight among a plurality of subfields in one field period; and a driver for forming a drive signal based on said information and for outputting said drive signal to said display panel.

10. A display apparatus for displaying an image having gradation represented by subfields comprising:

a display panel;

a circuit for outputting information in which total light emitting weights of subfields controlled on/off of light emission simultaneously in one field period are light emitting weights [N], [2·N], [3·N], . . . , [(K–1)·N], [K·N], [(K–1)·N], . . . , [2·N], [N] (K, N:natural numbers, where K is a natural number of at least 3); and a driver for forming a drive signal based on said information and for outputting said drive signal to said display panel.

11. A display apparatus for displaying an image having gradation represented by subfields comprising:

a display panel;

a circuit for outputting information in which a plurality of subfields in one field period is arranged so as to have plural array portions where allotted light emitting weights decrease gradually, and in which total light emitting weights of said subfields controlled on/off of light emission simultaneously is arranged so as to have light emitting weights [N], [2 N], [3 N], [(K–1)·N], [K·N], [(K–1)·N], . . . , [2·N], [N] (K, N:natural numbers, where K is a natural number of at least 3); and a driver for forming a drive signal based on said information and for outputting said drive signal to said display panel.

12. A display apparatus for displaying an image having gradation represented by subfields comprising:

a display panel;

a circuit for outputting information in which a plurality of subfields in one field period is arranged such that light emitting weights [N], [2 N], [3 N], [(K–1)·N], [K·N], [(K–1)·N], . . . , [2·N], [N] (K, N:natural numbers, where K is a natural number of at least 3) are arranged to 2·K–1 subfields including a maximum light emitting weight;

a first light emitting circuit for performing light emission in said respective subfields in the first order;

a second light emitting circuit for performing light emission in said respective subfields in the second order different from said first order; and switching circuit for switching said first and second light emitting circuits by a predetermined period.

13. A display apparatus according to claim 12, wherein said switching circuit is switched any of a field unit period, line unit period and a pixel unit period.

14. A display apparatus according to claim 12, wherein said switching circuit selects light emitting circuits in accordance with an arranged portion of each pixel.

15. A display apparatus according to claim 12, wherein when pixels are in a checker-flag matrix arrangement, said switching circuit switches said light emitting circuit at a white pixel position and said light emitting circuit at a black pixel position.

16. A display apparatus according to claim 12, wherein said switching circuit switches said first light emitting circuit for light emission at the white pixel position and said second light emitting circuit for light emission at the black pixel position in every one field.

17. A display apparatus for displaying an image having gradation represented by subfields comprising:

a display panel;

a circuit for outputting information in which a plurality of subfields in one field period is arranged so as to have first plural array portions where allotted light emitting weights increases gradually and second plural array portions where allotted light emitting weights decreases gradually, and in which light emitting weights [N], [2 N], [3 N], [(K−1)·N], [K·N], [(K−1)·N], . . . , [2·N], [N] (K, N:natural numbers, where K is a natural number of at least 3) is arranged so as to be allotted to 2·K−1 subfields including subfields having a maximum light emitting weight;

a driver for forming a drive signal based on said information and for outputting said drive signal to said display panel;

first light emitting circuit for performing light emission in said respective subfields in the first order;

second light emitting circuit for performing light emission in said respective subfields in the second order different from said first order; and switching circuit for switching said first and second light emitting circuits by a predetermined period.

18. A display apparatus according to claim 17, wherein said switching circuit is switched by any of a field unit period, line unit period and a pixel unit period.

19. A display apparatus according to claim 17, wherein said switching circuit selects light emitting circuits in accordance with an arranged portion of each pixel.

20. A display apparatus for displaying an image having gradation represented by subfields comprising:

a display panel;

a circuit for outputting information in which total light emitting weights of subfields among a plurality of subfields in one field and controlled on/off of light emitting weights [N], [2 N], [3 N], [(K−1)·N], [K·N], [(K−1)·N], . . . , [2·N], [N] (K, N:natural numbers), where K is a natural number of at least 3); and a driver for forming a drive signal based on said information and for outputting said drive signal to said display panel;

first light emitting circuit for performing light emission in said respective subfields in the first order;

second light emitting circuit for performing light emission in said respective subfields in the second order different from said first order; and switching circuit for switching said first and second light emitting circuits by a predetermined period.

21. A display apparatus according to claim 20, wherein said switching circuit is switched by any of a field unit period, line unit period and a pixel unit period.

22. A display apparatus according to claim 20, wherein said switching circuit selects light emitting circuits in accordance with an arranged portion of each pixel.

23. A display apparatus for displaying an image having gradation represented by subfields comprising:

a display panel;

a circuit for outputting information in which a plurality of subfields in one field period is arranged so as to have first plural array portions where allotted light emitting weights increase gradually and second plural array portions where allotted light emitting weights decrease gradually, and in which total light emitting weights of said subfields controlled on/off of light emission simultaneously is arranged so as to have light emitting weights [N], [2 N], [3 N], [(K−1)·N], [K·N], [(K−1)·N], . . . , [2·N], [N] (K, N:natural numbers, where K is a natural number of at least 3); and a driver for forming a drive signal based on said information and for outputting said drive signal to said display panel;

first light emitting circuit for performing light emission in said respective subfields in the first order;

second light emitting circuit for performing light emission in said respective subfields in the second order different from said first order; and switching circuit for switching said first and second light emitting circuits by a predetermined period.

24. A display apparatus according to claim 23, wherein said switching circuit is switched by any of a field unit period, line unit period and a pixel unit period.

25. A display apparatus according to claim 23, wherein said switching circuit selects light emitting circuits in accordance with an arranged portion of each pixel.

26. A display apparatus for displaying an image having gradation represented by subfields comprising:

a display panel;

a circuit for outputting information in which a plurality of subfields in one field period is arranged such that light emitting weights [N], [2 N], [3 N], [(K−1)·N], [K·N], [(K−1)·N], . . . , [2·N], [N] (K, N:natural numbers, where K is a natural number of at least 3) are allotted to 2·K−1 subfields including a maximum light emitting weight;

a driver for forming a drive signal based on said information and for outputting said drive signal to said display panel;

first light emitting circuit for performing light emission in said respective subfields in the first order;

second light emitting circuit for performing light emission in said respective subfields in the second order different from said first order; and changing means for changing said first and second light emitting circuits by a predetermined period.

27. A display apparatus for displaying an image having gradation represented by subfields comprising:

a display panel;

a circuit for outputting information in which a plurality of subfields in one field period is arranged so as to have first plural array portions where allotted light emitting weights increase gradually and second plural array portions where allotted light emitting weights decreases gradually, and in which light emitting weights [N], [2 N], [3 N], [(K−1)·N], [K·N], [(K−1)·N], . . . , [2·N], [N] (K, N:natural numbers, where K is a natural number of at least 3) are arranged so as to be allotted to 2·K−1 subfields including subfields having a maximum light emitting weight;

a driver for forming a drive signal based on said information and for outputting said drive signal to said display panel;

first light emitting circuit for performing light emission in said respective subfields in the first order;

second light emitting circuit for performing light emission in said respective subfields in the second order different from said first order; and changing means for changing said first and second light emitting circuits by a predetermined period.

28. A display apparatus for displaying an image having gradation represented by subfields comprising:

a display panel;

a circuit for outputting information in which total light emitting weights of subfields among a plurality of subfields in one field period and controlled on/off of light emission simultaneously are light emitting weights [N], [2 N], [3 N], [(K−1)·N], [K·N], [(K−1)·N], . . . , [2·N],[N] (K, N:natural numbers, where K is a natural number of at least 3); and a driver for forming a drive signal based on said information and for outputting said drive signal to said display panel;

first light emitting circuit for performing light emission in said respective subfields in the first order;

second light emitting circuit for performing light emission in said respective subfields in the second order different from said first order; and changing means for changing said first and second light emitting circuits by a predetermined period.

29. A display apparatus for displaying an image having gradation represented by subfields comprising:

a display panel;

a circuit for outputting information in which a plurality of subfields in one field period is arranged so as to have first plural array portions where allotted light emitting weights increase gradually and second plural array portions where allotted light emitting weights decrease gradually, and in which total light emitting weights [N], [2 N], [3 N], [(K−1)·N], [K·N], [(K−1)·N], . . . , [2·N], [N] (K, N:natural numbers, where K is a natural number of at least 3); and a driver for forming a drive signal based on said information and for outputting said drive signal to said display panel;

first light emitting circuit for performing light emission in said respective subfields in the first order;

second light emitting circuit for performing light emission in said respective subfields in the second order different from said first order; and changing means for changing said first and second light emitting circuits by a predetermined period.

* * * * *